United States Patent [19]
Sand et al.

[11] 3,760,062
[45] Sept. 18, 1973

[54] SYNTHETIC ZEOLITE
[75] Inventors: Leonard B. Sand; Michael L. Sand, both of Holden, Mass.
[73] Assignee: Zeochem Corporation, Worcester, Mass.
[22] Filed: Oct. 26, 1971
[21] Appl. No.: 192,488

[52] U.S. Cl.................................. 423/329, 423/328
[51] Int. Cl............................................ C01b 33/28
[58] Field of Search................... 423/328, 329, 330, 423/118, 112; 252/455 Z

[56]  References Cited
UNITED STATES PATENTS
3,436,174   4/1969   Sand .................................. 423/328
3,415,736   12/1968  Ceric ............................. 423/329 X
3,411,874   11/1968  Ciric ................................... 423/329

OTHER PUBLICATIONS
Ames, "The American Mineralogist" Vol. 48, 1963, pages 1374–1381.

Barrer, "J. Chem. Soc." (1948) pages 2158–2163.

Barrer et al., "J. Chem. Soc." (1951) pages 1267–1278.

Primary Examiner—Edward J. Meros
Attorney—Norman S. Blodgett

[57]                ABSTRACT

Crystalline zeolites are prepared from lithia and lithia-soda systems. A lithium crystalline zeolite having the mordenite crystal structure is prepared from a lithia system having the oxide mole ratios $Li_2O/Al_2O_3/SiO_2/H_2O$ of 3/1/40/314. A lithium-sodium crystalline zeolite having the mordenite crystal structure and the formula $0.34Li_2O \cdot 0.36Na_2O \cdot Al_2O_3 \cdot 10.2SiO_2 \cdot 6.6H_2O$ is prepared from a lithia-soda system.

2 Claims, 2 Drawing Figures

M = MORDENITE
AC = ANALCIME
OP = OPALINE SILICA
L = $Li_2O$, N = $Na_2O$
PH = PHILLIPSITE
Q = QUARTZ
A = $Al_2O_3$

CRYSTALLIZATION CURVE FOR SMALL-PORT LITHIUM, SODIUM MORDENITE AT 200°C.

3,760,062

SYNTHETIC ZEOLITE

BACKGROUND OF THE INVENTION

Apparently, no lithium-containing mordenites have been found in natural occurrences, but there are calcium, sodium mordenites with varying but small contents of potassium. It is interesting to note that the first probable synthesis of mordenite in 1927 by Leonard (Leonard, R. J., The Hydrothermal Alteration of Certain Silicate Minerals, Econ. Geol., 22, 18–43, 1927) was the autoclaved product of reacting sodium carbonate solution with spodumene. Although the product, identified tentatively as "mordenite" was not analyzed, the results of studies suggest that he synthesized a Na-Li-mordenite. Since the original work of Barrer (Barrer, R. M., Synthesis and Reactions of Mordenite, J. Chem. Soc., 2158–63, 1948) in 1948 on the syntheses of small-port sodium mordenites, a relatively large number of investigators, including later contributions by Barrer, have reported on the synthesis of mordenites from a variety of starting materials in other systems as well as those containing sodium. (Ames, L.L., Jr., Synthesis of a clinoptilolite-like zeolite, Am. Mineral., 48, 1374–80, 1963). Conspicuously absent from the list of synthetic mordenites (considering ion exchanged varieties as derivatives of synthetic mordenites) has been synthetic lithium mordenite and synthetic potassium mordenite. Separate from these relatively high temperature syntheses of small-port mordenites was the discovery of conditions to synthesize large-port sodium mordenites. (Sand, L. B. Synthesis of Large-Port and Small-Port Mordenites, Soc. Chem. Ind. Spec. Pub., 'Molecular Sieves', 71–78, 1968)

The synthesis of two new zeolite-like phases reported by Barrer and White (Barrer, R. M. and White, E.A.D., The Hydrothermal Chemistry of Silicates. Part I. Synthetic Lithium Aluminosilicates, J. Chem. Soc., 1267–1278, 1951) in 1951 and the synthesis of a clinoptilolite-like phase by Ames in 1963 represent the reported hydrothermal zeolite synthesis in the lithia system. In 1960 Hoss and Roy (Hoss, H. and Roy, R., Zeolite Studies III: On Natural Phillipsite, Gismondite, Harmotome, Beitrage zur Mineral. u. Petrog., 7, 389–408, 1960) reported the hydrothermal conversion of lithium-exchanged gmelinite to bikitaite at 250° C and 1,000 atm. Barrer used lithium hydroxide, amorphous aluminum hydroxide, and silicic acid as reactants in which the batch compositions were 2 gms of gel ($Li_2O \cdot Al_2O_3 \cdot nSiO_2 \cdot nH_2O$ in which n varied between 1 and 10) dried at 120° C and 10cc of water or N lithia solution. In the temperature range 130°–450° C using these reactants, no mordenite, analcime, or phillipsite was reported as synthesized. In 1953 Barrer, Baynham and McCallum (Barrer, R.M., Baynham, J.W. and McCallum, N., Hydrothermal Chemistry of Silicates. Part V. Compounds Structurally Related to Analcite, J. Chem. Soc., 4035–41, 1953) reported on Na-, K-, Rb-, Tl- and Cs-analcimes synthesized from gels but that Li-analcime was made only indirectly by ion-exchange procedures with Ag-exchanged Na-analcime as an intermediate. Ames synthesized the clinoptilolite-like phase at 295° in the lithia system using silica gel, aluminum hydroxide and lithium hydroxide as reactants and batch compositions ranging from $0.6\ Li_2O \cdot Al_2O_3 \cdot 8\ SiO_2 \cdot 5\ H_2O$ to $Li_2O \cdot Al_2O_3 \cdot 10SiO_2 \cdot 8.5H_2O$; and he synthesized mordenite at 295° C in the lithia-soda system using the same reactants with the addition of sodium hydroxide and a batch composition of $Li_2O \cdot Na_2O \cdot Al_2O_3 \cdot 10SiO_2 \cdot 8.5H_2O$.

SUMMARY OF THE INVENTION

In general, the invention consists of synthetic lithium mordenite having a typical formula $0.34LiO_2$- $0.36\ Na_2O \cdot Al_2O_3 \cdot 10.2SiO_2 \cdot 6.6H_2O$. More specifically, it consists of a method for making a mordenite-like zeolite by reacting in a closed vessel under autogenous pressure a composition having oxide mole ratios $Li_2O/Al_2O_3/SiO_2/H_2O$ of 3/1/40/314.

BRIEF DESCRIPTION OF THE DRAWINGS

The character of the invention, however, may be best understood by reference to the accompanying drawings in which.

DESCRIPTION OF THE PREFERRED EMBODIMENT

Figure 1:
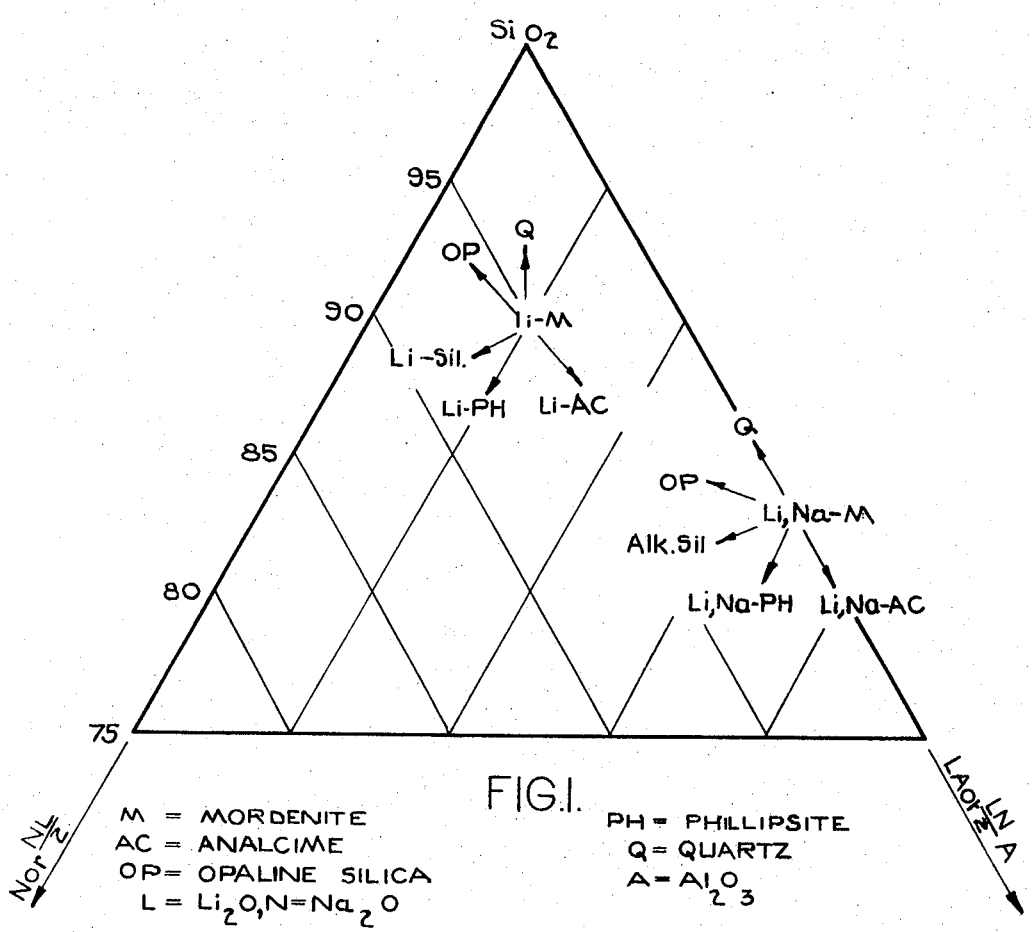
FIG. 1 is a schematic drawing of compositional areas (mole basis) for producing lithium and lithium-sodium zeolites.

In carrying out the method of the invention, the following procedures were used. The reactants used were reagent grade lithium carbonate, lithium hydroxide, and sodium hydroxide, aluminum hydroxide (Grades C-31, C-730, Hydral 705 and 710 ALCOA), precipitated silicic acid (Fisher Scientific), ammonium-stabilized aqueous colloidal silica sol (Ludox "AS," DuPont). Other reactants, which were tried and found to be unsatisfactory to produce mordenite as a phase under the experimental conditions investigated, were fumed silica, silica gel, silica-alumina gels, diatomite and sodium aluminate. 12ml. capacity, silver-lined and silver-sealed modified Morey-type reactor vessels were used in all runs. New, separate sets of vessels were used for reactions in the lithia and in the lithia-soda systems to avoid contamination. Reactants were mixed in a mortar and pestle and loaded into the autoclaves to 6mm. from the top. When the mixtures were of a "dry" consistency, they were tamped firmly into the vessel. The charged vessels were weighed before and after runs to detect small leaks. The vessels were placed in controlled air ovens at temperature and upon completion of the run were quenched under cold tap water. The contents were extracted, dispersed gently in a mortar and pestle, and washed to near neutral on a Buchner funnel before oven drying at 80° C. The phases were identified and data taken from X-ray diffractograms obtained on a G.E. XRD-5 unit and from films taken with a Norelco 114.6 mm. diameter powder camera using aluminum powder as an internal standard and copper, nickel-filtered radiation. To obtain mean indices of refraction of the three synthetic mordenites, the samples first were water-saturated and equilibrated at room temperature in a controlled atmosphere ($P/P_s$=0.75). Crystallization curves were obtained by placing a number of identically charged autoclaves in the pre-set oven, removing each at successive time intervals, and determining the percent crystallization by the summation of peak intensities on the X-ray diffractograms using a reference mordenite standard. Crystallization was checked by microscopic examination as the zeolites crystallized as euhedral crystals in the 5–25μm range and could be differentiated from the unreacted material. An evaluation of reactant materials showed that this parameter was much more critical than in other systems producing zeolites, and probably is the reason these common zeolites had not been synthesized in earlier studies in the lithia system. The most successful combination of reactants to produce these zeolites was lithium carbonate, aluminum hydroxide (Hydral 710), and ammonium-stabilized aqueous colloidal silica sol (Ludox AS). 100 percent yields of Li-analcime were obtained, but to date, Li-mordenite and Li-phillipsite have been obtained up to 75 percent yield each with the other present as a co-existing phase. Typical runs are given in Table 1. The Li-modenite crystals occur with the same morphology as synthetic Na-mordenite crystals with 010, 100, and 001 pinacoids predominating and some crystals with prism terminations, all in the size range 5–25 $\mu$m. The mean index of refraction is 1.470. The Li-phillipsite crystals are acicular (needle-like) to 15 $\mu$m length with a mean index of refraction 1.504. The Li-analcime crystals occurred as equant crystals in the 20–80 $\mu$m size range or as crystal composites. As has been reported by Saha (Saha, P., Geochemical and X-Ray Investigation of Natural and Synthetic Analcites, Am. Mineral., 44, 300-13, 1959) for Na-analcime synthesized from glasses, a substitutional series for Al for Si obtains also in the synthetic Li-analcimes. A range was found of $a_o = 13.64\text{A}$, n = 1.483 for Li-analcime synthesized from siliceous batch compositions to $a_o = 13.69\text{A}$, n = 1.488 for Li-analcime synthesized from low silica batch compositions.

TABLE 1. Some typical Runs in the Lithia System.

| Batch Composition $Li_2O/Al_2O_3/SiO_2/H_2O$ | T,°C | Time hr. | Products |
|---|---|---|---|
| 6/1/40/314 | 180 | 65 | Phillipsite(major) Mordenite(moderate) Analcime(weak) |
| 3/1/40/314 | 180 | 65 | Mordenite(major) Phillipsite (moderate) Analcime(weak) |
| 0.2/1/20/158 | 174 | 21 | Analcime |
| 1/1/4/34 | 152 | 67 | Analcime |
| 12.0/1/34.33/270 | 1503 | 70 | Phillipsite(major) Mordenite(weak) |

Figure 2:
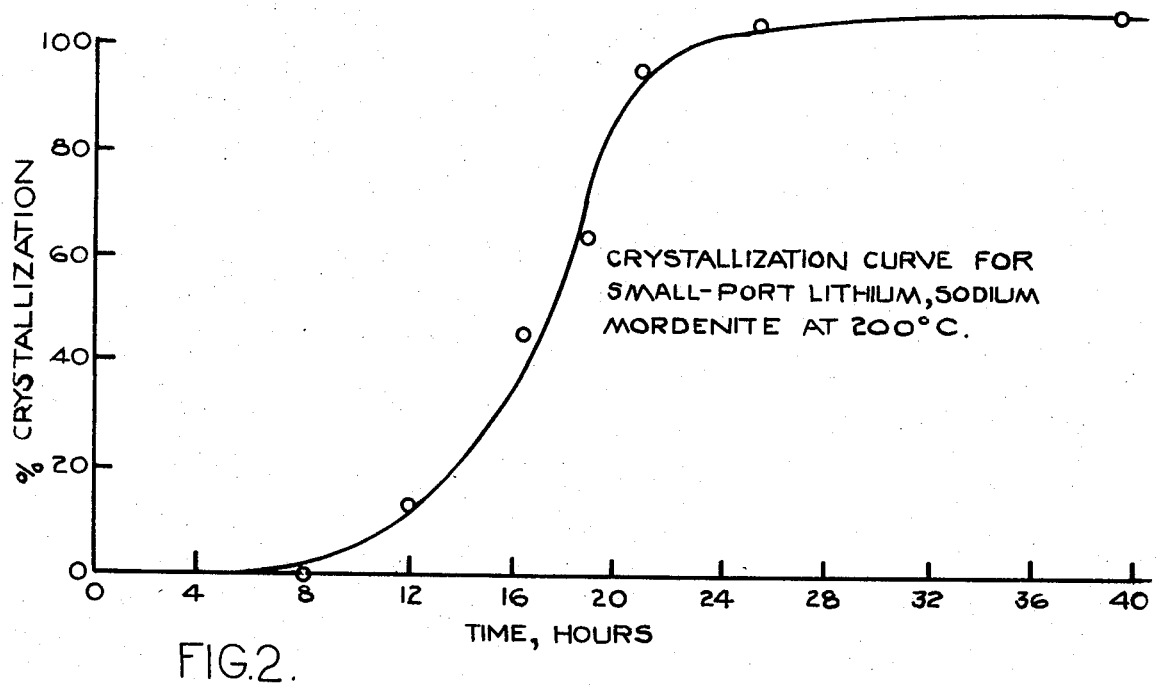
FIG. 2 shows a crystallization curve for small-port lithium-sodium mordenite.

When the lithium phases were discovered, investigations were started in the lithia-soda system to determine if zeolites of intermediate composition could be synthesized. A 1:1 ratio of lithia to soda was used in all batch compositions. It was found that silicic acid, lithium hydroxide, sodium hydroxide, and aluminum hydroxide (Hydral 710) were the best combinations of reactants to produce the Li,Na zeolites, mordenite, phillipsite and analcime. Typical runs are given in Table 2. A compositional diagram is given in FIG. 1 to show the general areas of synthesis of small-port mordenite and co-existing phases in the lithia and lithia-soda systems. The small port Li,Na-mordenite, as is the case with small-port Na-mordenite is synthesized on composition, whereas, the small-port Li-mordenite could not be synthesized on composition. A 90 percent yield (10% opaline silica) of Li,Na-mordenite was obtained, and a crystallization curve on this synthesis is shown in FIG. 2. Its chemical analysis is as follows: 70.12$SiO_2$, 11.69$Al_2O_3$, 2.55$Na_2O$, 1.18$Li_2O$, 13.60L.O.I. (W. H. Gerdes, analyst), which calculates to a formula of 0.345$Li_2O$-0.360$Na_2O$-$Al_2O_3$-10.2$SiO_2$-6.6$H_2O$. The deficiency in exchangeable alkali probably is due to hydrogen exchange. Its mean index of refraction is 1.471.

X-ray diffraction data for small-port Na-, large-port Na-, small-port Li-, and small-port Li,Na-mordenites are given in Table 3.

The small-port characteristics of the mordenites were determined by benzene sorption capacities, which were found negligible, at low partial pressures of benzene (0.01–0.06) at room temperature using a quartz microspring balance.

TABLE 2. Some Typical Runs in the Lithia-Soda System.

| Batch Composition $Li_2O/Na_2O/Al_2O_3/SiO_2/H_2O$ | Reactants* | T °C | Time hr. | Products |
|---|---|---|---|---|
| 1.25/1/25/1/10/25 | A | 185 | 84 | Mordenite (major) Analcime (mod.) |
| 0.5/0.5/1/5/50 | A | 187 | 48 | Analcime (major) Mordenite (minor) |
| 0.5/0.5/1/10/50 | B | 200 | 24 | Mordenite |
| 0.5/0.5/1/10/50 | C | 190 | 48 | Mordenite (major) Quartz(mod.) |
| 4.9/4.9/1/39.2/490 | D | 150 | 336 | Mordenite (mod.) Phillipsite (mod.) |
| 0.5/0.5/1/10/100 | E | 190 | 16 | Analcime |

*A – Grade C-730 aluminum hydroxide
B – Grade Hydral 710 aluminium hydroxide
C – Grade C-31 aluminum hydroxide
D – Grade Hydral 705 aluminum hydroxide
R – Grade Hydral 705 aluminum hydroxide and Ludox AS

TABLE 3.—X RAY DIFFRACTION DATA FOR SYNTHETIC MORDENITES

| Synthetic small port Na-mordenite [1] | | Synthetic large port Na-mordenite | | Synthetic small port Na, Li-mordenite | | Synthetic small port Li-mordenite | |
|---|---|---|---|---|---|---|---|
| d,A | I | d,A | I | d,A | I | d,A | I |
| 13.53 | 40 | 13.4 | 40 | 13.5 | 40 | 13.5 | 30 |
| 10.24 | ---- | 10.2 | 10 | 10.2 | 10 | 10.3 | 10 |
| 9.06 | 50 | 9.02 | 70 | 9.02 | 80 | 9.02 | 75 |
| 6.57 | 55 | 6.50 | 50 | 6.51 | 50 | 6.50 | 40 |
| 6.39 | ---- | 6.32 | 30 | 6.32 | 25 | 6.32 | 15 |
| 6.08 | ---- | 6.02 | 10 | 6.01 | 10 | 5.98 | 10 |
| 5.80 | 15 | 5.75 | 20 | 5.75 | 25 | 5.75 | 25 |
| 5.05 | ---- | 5.03 | 2 | 5.03 | 2 | 5.05 | 2 |
| 4.83 | ---- | 4.84 | 2 | 4.84 | 5 | 4.80 | 2 |
| 4.52 | 25 | 4.50 | 35 | 4.50 | 40 | 4.49 | 45 |
| 4.15 | ---- | 4.12 | 5 | 4.11 | 5 | (2) | ---- |
| 4.00 | 60 | 3.97 | 70 | 3.96 | 70 | 3.97 | 60 |
| 3.84 | ---- | 3.81 | 15 | 3.80 | 10 | 3.80 | 20 |
| 3.76 | ---- | 3.73 | 10 | 3.72 | 10 | 3.73 | 10 |
| 3.53 | ---- | 3.52 | 10 | 3.52 | 5 | (2) | ---- |
| 3.47 | 100 | 3.45 | 100 | 3.44 | 100 | 3.45 | 60 |
| 3.39 | ---- | 3.37 | 60 | 3.37 | 65 | 3.37 | 50 |
| 3.29 | ---- | 3.28 | 10 | 3.28 | 10 | (2) | ---- |
| 3.22 | ---- | 3.21 | 55 | 3.20 | 65 | 3.20 | 100 |
| 3.16 | ---- | 3.13 | 10 | 3.13 | 10 | 3.13 | 10 |

[1] Domine, D. and Quobex, J., Synthesis of Mordenite, Soc. Chem. Ind. Spec. Pub., "Molecular Sieves," 78-84, 1968.
[2] Masked by phillipsite.

The phase studies in the siliceous portion of the lithia system and the lithia-soda system resulted in the synthesis of modenites with the same coexisting phases - analcimes, phillipsites, quartz, opaline silica, and crystalline alkali silicates — as had been found in the soda system. Whereas, the starting materials used as reactants are not critical parameters in the synthesis of these zeolites in the soda system, the choice of reactants is a predominant factor in lithia-containing systems to produce these phases. The mechanism is not yet understood, but the sensitivity of these systems to starting materials provides an excellent opportunity to correlate the reactivity of interacting chemicals in studying the kinetics of zeolite crystallization. Varying the grade of crystalline aluminum hydroxide along made a very large difference in the reaction products of both the lithia and lithia-soda systems. In the lithia system, in which aqueous colloidal silica sol was found effective, the use of stirred autoclaves probably would eliminate part of the difficulty in determining the phase relationships. Although these studies were carried out primarily in the siliceous compositional region, the extension of the investigation into several lower silica compositions to evaluate the solid solution effects in the analcimes showed excellent crystallization of phases in this region.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

We claim:

1. A method for making a zeolite having a crystal structure resembling mordenite, comprising reacting in a closed container, under autogenous pressure, a composition having the oxide mole ratios $Li_2O/Al_2O_3/SiO_2/H_2O$ of 3/1/40/314 at a temperature of around 180° C. for a period of time sufficient to form a zeolite having the mordenite-like crystal structure.

2. A method as recited in claim 1, where the period of time is around 65 hours.

* * * * *